United States Patent
Takahashi

(10) Patent No.: US 6,350,059 B1
(45) Date of Patent: Feb. 26, 2002

(54) THRUST DYNAMIC PRESSURE BEARING WITH VARYING DEPTH GROOVES

(75) Inventor: Takeshi Takahashi, Kashiba (JP)

(73) Assignee: Koyo Seiko Co., Ltd., Osaka-fu (JP)

( * ) Notice: Subject to any disclaimer, the term of this patent is extended or adjusted under 35 U.S.C. 154(b) by 0 days.

(21) Appl. No.: 09/587,226

(22) Filed: Jun. 2, 2000

(30) Foreign Application Priority Data

Jun. 8, 1999 (JP) ............................................ 11-160890

(51) Int. Cl.$^7$ ................................................. F16C 32/06
(52) U.S. Cl. ......................................................... 384/123
(58) Field of Search ................................ 384/112, 121, 384/123, 100, 368, 420

(56) References Cited

U.S. PATENT DOCUMENTS 4,678,348 A * 7/1987 Tielemans et al. ........... 384/114
5,381,456 A * 1/1995 Vetter et al. ............. 384/123 X

FOREIGN PATENT DOCUMENTS

| JP | 2781573 | 6/1990 | |
| JP | 02278007 A | * 11/1990 | ................. 384/123 |

* cited by examiner

Primary Examiner—Thomas R. Hannon
(74) Attorney, Agent, or Firm—Jordan and Hamburg LLP

(57) ABSTRACT

It is an object of the invention to provide a thrust dynamic pressure bearing in which a lubricant fluid can be efficiently gathered into a radially center portion of a herringbone-type dynamic pressure generating groove, so that the load ability can be maximized.

In the thrust dynamic pressure bearing, the groove depth $H_1$ of an outer circumference portion 3A in which a centrifugal force is strongest is made largest, so that the ability of gathering a lubricant fluid toward a center portion 3B of the herring-bone-type dynamic pressure generating groove 3 is maximized. The depth $H_2$ of the dynamic pressure generating groove in an inner circumference portion 3C in which the centrifugal force is weakest but the ability of gathering the lubricant fluid toward the center portion 3B is required is set to the second largest one. The groove depth $H_3$ of the center portion 3B into which the lubricant fluid is gathered because of the herringbone shape of the dynamic pressure generating groove is made to be smallest. Therefore, the ability of gathering the lubricant fluid from the outer circumference portion 3A with the maximum centrifugal force toward the center portion 3B, and that of gathering the lubricant fluid from the inner circumference portion 3C with the minimum centrifugal force toward the center portion 3B can be balanced, so that the lubricant fluid can be efficiently gathered into the radially center portion 3B of the dynamic pressure generating groove 3.

1 Claim, 2 Drawing Sheets

THRUST DYNAMIC PRESSURE BEARING WITH VARYING DEPTH GROOVES

BACKGROUND OF THE INVENTION

The invention relates to a thrust dynamic pressure bearing in which herringbone-type dynamic pressure generating grooves are formed in a thrust bearing face.

Conventionally, as shown in FIGS. 2(A) and 2(B), in such a kind of thrust dynamic pressure bearing, each of herringbone-type dynamic pressure generating grooves 102 formed in a thrust bearing face 101 has a uniform depth h.

When the depth of a herringbone-type dynamic pressure generating groove is uniform as in the prior art, however, it has been known that a lubricant fluid cannot be efficiently gathered into a radially center portion of the herringbone-type dynamic pressure generating groove, because of the influence of a centrifugal force generated during the rotation or the like, and hence the load ability cannot be maximized.

SUMMARY OF THE INVENTION

It is an object of the invention to provide a thrust dynamic pressure bearing in which a lubricant fluid can be efficiently gathered into a radially center portion of a herringbone-type dynamic pressure generating groove, so that the load ability can be maximized.

The inventors have noted the fact that the centrifugal force generated during the rotation which acts on a lubricant fluid in a thrust bearing face varies depending on positions in a radial direction, thereby configuring the invention.

That is, the thrust dynamic pressure bearing of the invention is characterized in that, in a thrust dynamic pressure bearing in which herringbone-type dynamic pressure generating grooves are formed in a thrust bearing face, a depth of an inner circumference portion of each of the dynamic pressure generating grooves is larger than a depth of a radially center portion of the dynamic pressure generating groove, and a depth of a radially outer circumference portion of the dynamic pressure generating groove is larger than the depth of the inner circumference portion.

In the thrust dynamic pressure bearing of the invention the depth of each of the dynamic pressure generating grooves in the outer circumference portion in which the centrifugal force is strongest is made largest, so that the ability of gathering the lubricant fluid toward the center portion of the herringbone-type dynamic pressure generating groove is maximized. The dynamic pressure generating groove in the inner circumference portion in which the centrifugal force is weakest but the ability of gathering the lubricant fluid toward the center portion is required has the second largest depth. Therefore, the ability of gathering the lubricant fluid toward the center portion of the herringbone-type dynamic pressure generating groove is balanced between the outer circumference portion and the inner circumference portion. The center portion of the herringbone-type dynamic pressure generating groove into which the lubricant fluid is gathered because of the herringbone shape of the dynamic pressure generating groove is shallowest.

According to this configuration, the lubricant fluid can be efficiently gathered into the radially center portion of the dynamic pressure generating groove, and the load ability can be maximized.

DETAILED DESCRIPTION OF THE PREFERRED EMBODIMENTS

Hereinafter, the invention will be described in detail by way of an illustrated embodiment.

Figure 1A:
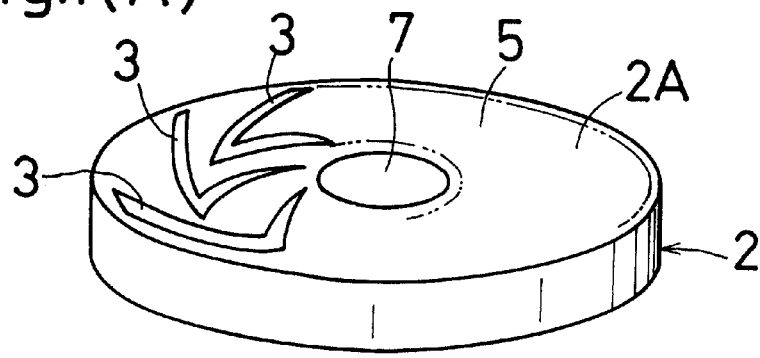
FIG. 1(A) is a view showing the shape of herringbone-type dynamic pressure generating grooves in a thrust bearing face of an embodiment of the thrust dynamic pressure bearing of the invention.

FIG. 1 shows an embodiment of the thrust dynamic pressure bearing of the invention. In the thrust dynamic pressure bearing, a plurality of herringbone-type dynamic pressure generating grooves 3 are formed at regular intervals in a circumference direction in an end face 2A of a flange 2 which is formed on an end face of a shaft 1.

The end face 2A functions as a thrust bearing face 5. The thrust bearing face 5 is opposed to a flat face 6A of a housing with forming a predetermined space therebetween. The space between the end face and the face 6A is filled with a lubricant fluid (for example, a lubricant oil).

Figure 1B:
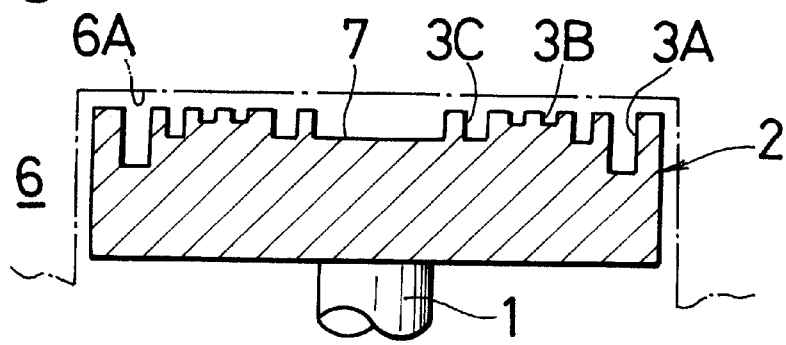
FIG. 1(B) is a section view showing the depths of the herringbone-type dynamic pressure generating grooves.
Figure 1C:
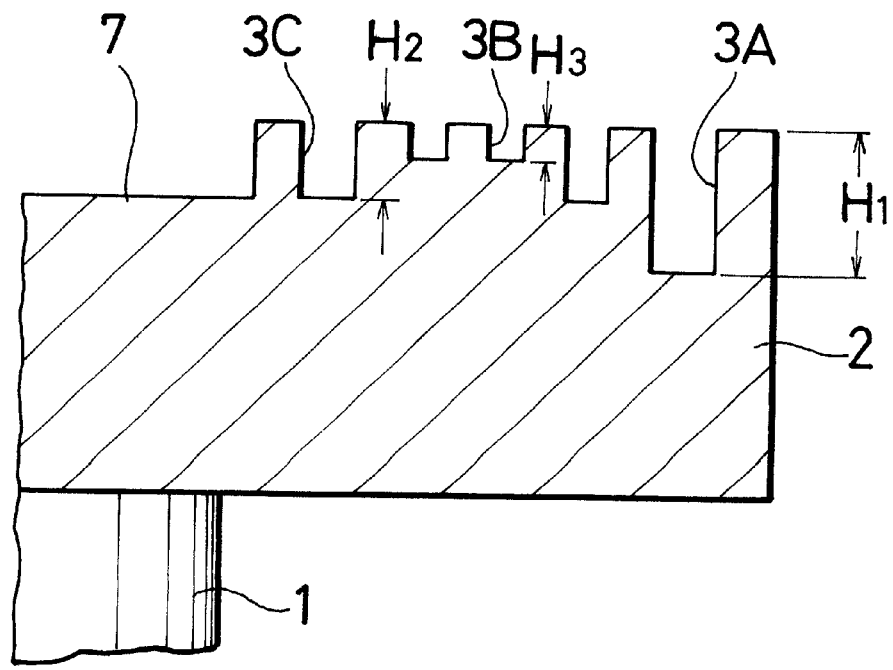
FIG. 1(C) is a partial enlarged view of FIG. 1(B)
Figure 2A:
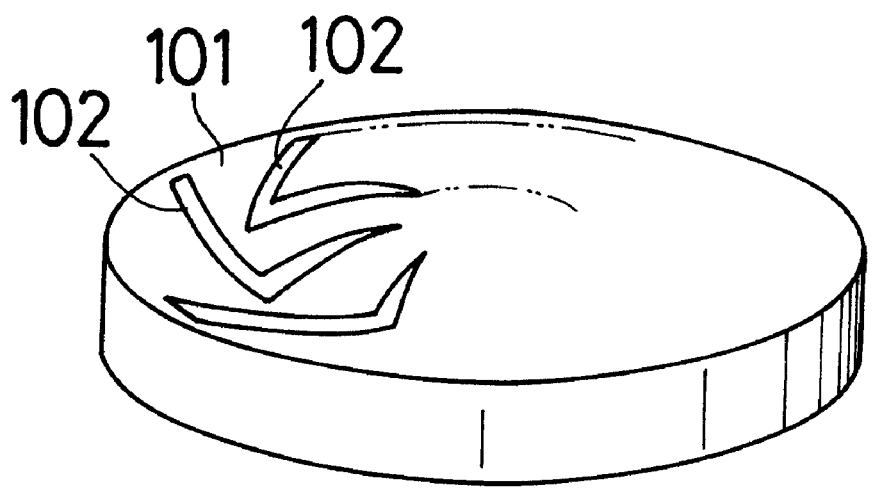
FIG. 2(A) is a view showing the shape of herringbone-type dynamic pressure generating grooves in a thrust bearing face of a thrust dynamic pressure bearing of the prior art.
Figure 2B:
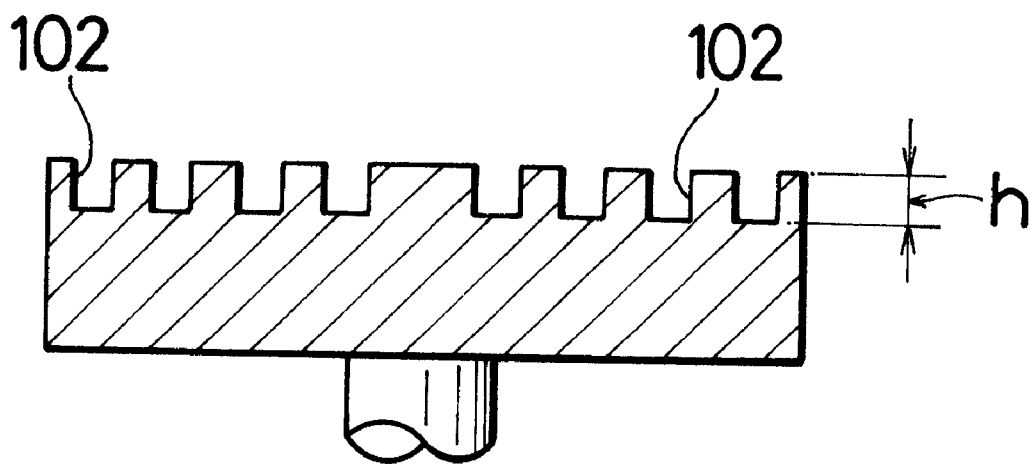
FIG. 2(B) is a section view showing the depths of the herringbone-type dynamic pressure generating grooves.

As shown in FIG. 1(B), each of the herringbone-type dynamic pressure generating grooves 3 formed in the end face 2A of the flange 2 has a depth which gradually decreases as moving from an outer circumference portion 3A on the radially outermost side toward a center portion 3B, and which gradually decreases as moving from an inner circumference portion 3C on the radially innermost side toward the center portion 3B. As shown in FIG. 1(C) which is a partial enlarged view of FIG. 1(B), the groove depth $H_1$ in the outer circumference portion 3A on the radially outermost side is larger than the groove depth $H_2$ in the inner circumference portion 3C on the radially innermost side. In other words, the following relationships are established: the depth $H_2$ of the radially outer circumference portion 3A of the herringbone-type dynamic pressure generating groove 3>the groove depth $H_2$ of the inner circumference portion 3C>the groove depth $H_3$ of the center portion 3B. A circular concave portion 7 is formed in a center area of the thrust bearing face 5.

In the thrust dynamic pressure bearing with the above-described configuration, the groove depth $H_1$ in the outer circumference portion 3A in which the centrifugal force is strongest is made largest, so that the ability of gathering the lubricant fluid toward the center portion 3B of the herringbone-type dynamic pressure generating groove 3 is maximized. The depth $H_2$ of the dynamic pressure generating groove in the inner circumference portion 3C in which the centrifugal force is weakest but the ability of gathering the lubricant fluid toward the center portion 3B is required is set to the second largest one. Therefore, the ability of gathering the lubricant fluid toward the center portion 3B of the herringbone-type dynamic pressure generating groove 3 is balanced between the outer circumference portion 3A and the inner circumference portion 3C. The center portion 3B which is a center portion of the herringbone is configured as a high-pressure portion into which the lubricant fluid is gathered. Therefore, the groove depth $H_3$ of the center portion is made smallest.

According to this configuration, it is possible to realize a groove depth distribution which is balanced with respect to a centrifugal force acting on the lubricant fluid on the thrust bearing face 5, so that the effect of gathering the lubricant fluid into the center portion 3B of the herringbone can be enhanced to the highest degree. Thus, the load ability can be maximized.

In the embodiment, the thrust bearing face 5 is formed at an end in the axial direction of the shaft 1. Alternatively, a flange may be disposed at the center of the shaft 1 in the axial direction, and a thrust bearing face may be disposed in the flange.

As apparent from the above description, in the thrust dynamic pressure bearing of the invention, the depth of each of the dynamic pressure generating grooves in the outer circumference portion is made largest, and the depth of the dynamic pressure generating groove in the inner circumference portion is set to the second largest one, whereby the ability of gathering a lubricant fluid toward the center portion of the herringbone-type dynamic pressure generating groove is balanced between the outer circumference portion and the inner circumference portion. Thus, the lubricant fluid can be efficiently gathered into the radially center portion of the dynamic pressure generating groove, so that the load ability can be maximized.

What is claimed is:

1. A thrust dynamic pressure bearing in which herringbone-type dynamic pressure generating grooves are formed in a thrust bearing face, wherein a depth of an inner circumference portion of each of said dynamic pressure generating grooves is larger than a depth of a radially center portion of said dynamic pressure generating groove, and a depth of a radially outer circumference portion of said dynamic pressure generating groove is larger than the depth of said inner circumference portion.

* * * * *